United States Patent
Sonnenmoser

(10) Patent No.: US 9,546,072 B2
(45) Date of Patent: Jan. 17, 2017

(54) ENERGY USE IN ELEVATOR INSTALLATIONS

(71) Applicant: Inventio AG, Hergiswil (CH)

(72) Inventor: Astrid Sonnenmoser, Hochdorf (CH)

(73) Assignee: Inventio AG, Hergiswil (CH)

( * ) Notice: Subject to any disclaimer, the term of this patent is extended or adjusted under 35 U.S.C. 154(b) by 508 days.

(21) Appl. No.: 14/097,514

(22) Filed: Dec. 5, 2013

(65) Prior Publication Data

US 2014/0166407 A1    Jun. 19, 2014

(30) Foreign Application Priority Data

Dec. 18, 2012  (EP) .................................... 12197682

(51) Int. Cl.
*B66B 1/08*    (2006.01)
*B66B 1/24*    (2006.01)
*B66B 1/30*    (2006.01)

(52) U.S. Cl.
CPC .............. *B66B 1/2408* (2013.01); *B66B 1/302* (2013.01); *B66B 2201/216* (2013.01); *Y02B 50/122* (2013.01)

(58) Field of Classification Search
CPC ...... B66B 1/3407; B66B 1/2408; B66B 1/302; Y02B 50/122
USPC   187/247, 290, 296, 297, 391, 393; 318/375, 318/376; 307/66, 68
See application file for complete search history.

(56) References Cited

U.S. PATENT DOCUMENTS

| | | | | |
|---|---|---|---|---|
| 5,896,948 A * | 4/1999 | Suur-Askola | ............. | B66B 1/30 187/290 |
| 7,416,057 B2 * | 8/2008 | Kostka | ...................... | B66B 1/18 187/382 |
| 7,540,355 B2 * | 6/2009 | Harkonen | ............... | B66B 1/302 187/290 |
| 7,540,356 B2 * | 6/2009 | Smith | ..................... | B66B 5/027 187/289 |
| 7,554,278 B2 * | 6/2009 | Wegner-Donnelly | ... | B66C 13/18 187/277 |
| 7,681,694 B2 * | 3/2010 | Aulanko | ................. | B66B 1/302 187/277 |

(Continued)

FOREIGN PATENT DOCUMENTS

| EP | 2429053 A2 | 3/2012 |
|---|---|---|
| WO | 2010086290 A1 | 8/2010 |
| WO | 2012055566 A2 | 5/2012 |

*Primary Examiner* — Anthony Salata
(74) *Attorney, Agent, or Firm* — Fraser Clemens Martin & Miller LLC; William J. Clemens

(57) ABSTRACT

An elevator installation with an elevator unit, which is connected with a power supply mains, is controllable by an elevator control with consideration of first control information based on local requirements of users. The elevator control receives from the power supply mains second control information containing status data for the power supply mains. The first and second control information is evaluated by the elevator control. The elevator control influences operation, which is determined by the first control information, of the elevator installation in dependence on the second control information so as to enable desired operation in terms of energy. A monitoring unit, which determines status data for the power supply mains and provides information for the consumers, is connectible with the power supply mains. The monitoring unit creates second control information for the elevator control in dependence on loading of the power supply mains.

20 Claims, 3 Drawing Sheets

(56) References Cited

U.S. PATENT DOCUMENTS

| | | | |
|---|---|---|---|
| 8,083,033 B2* | 12/2011 | Kallioniemi | B66B 1/2458 187/290 |
| 8,172,042 B2* | 5/2012 | Wesson | B66B 1/308 187/290 |
| 8,220,590 B2* | 7/2012 | Chen | B66B 1/302 187/290 |
| 8,616,338 B2* | 12/2013 | Veronesi | B66B 1/302 187/290 |
| 8,714,313 B2* | 5/2014 | Harkonen | B66B 1/302 187/289 |
| 2012/0138388 A1 | 6/2012 | Finschi et al. | |
| 2014/0008155 A1* | 1/2014 | Rossignol | B66B 1/302 187/290 |
| 2015/0203328 A1* | 7/2015 | Horbrugger | B66B 1/302 187/290 |

* cited by examiner

ENERGY USE IN ELEVATOR INSTALLATIONS

CROSS-REFERENCE TO RELATED APPLICATION

This application claims priority to European Patent App. No. EP12197682.3, filed 18 Dec. 2012, which is incorporated herein by reference.

FIELD

The disclosure relates to energy us in an elevator installation.

BACKGROUND

Systems for generating electrical energy are seeing changes as a consequence of considerations relating to environmental policy. The classic energy supply mains with few large central power stations can be in the course of time superseded by a modern power supply mains with which numerous smaller energy suppliers are decentrally connected. The tasks to be solved by the operator of the modern power supply mains are as a result far more complex. The supply of renewable energy by energy suppliers, who utilize wind and solar energy, is in some cases plannable only to a limited extent and is subject to substantial fluctuations. In the immediate future a compound operation therefore may prevail in which compensation for failures of energy supplies of alternative energy suppliers is provided by energy supplies from conventional power stations.

In order to keep the supply of electrical energy delivered by the power stations in balance with the need for electrical energy and to help ensure stability and reliability of the power supply mains the energy suppliers and electricity users connected therewith can be continuously monitored. For that purpose the course of load of the power supply mains can be also monitored so as to determine time zones with higher loading. Based on the determined course of load, static electrical loads are switched off at critical time periods so that a load balance can be achieved over longer periods of time.

The connection and disconnection of loads is traditionally carried out by ripple control. In modern power supply mains, i.e. so-termed 'smart grids', ripple control is supplemented by 'smart meters', which allow detection of the state of the power supply mains close in time to numerous mains junctions. The communication of the decentral measuring units or 'smart meters' with a central station is possibly carried out by way of a network operating according to Internet protocols. A method for short-cyclic data detection and control of measuring points in an intelligent power supply mains, which uses smart metering or smart grid functions, is known, from, for example, WO 2012/055566 A2.

If a difference between the supply of and requirement for energy now arises, the regulating energy or regulating power made available by the energy suppliers is used in order to avoid collapse of the power supply mains in the case of increased need or an energy excess in the case of too-small demand. Compensation for the mentioned differences or fluctuations in the power supply mains is provided by means of the regulating energy.

The available regulating energy is divided into different categories. Regulating energy able to be called up within seconds is termed primary reserve. Regulating energy able to be called up within a minute is termed secondary reserve. Moreover, the regulating energy comprises reserve components which can be called up after quarter of an hour (minute reserve) or after hours (hour reserve).

In the case of overloading of the power supply mains, positive regulating energy or current is stored in the power supply mains. If there is an energy excess, negative regulating energy is taken from the power supply mains. Use of power stations capable of regulation is made for the required adaptations of output, such as rapid-response gas-turbine power stations or pumped-storage power stations. It can be disadvantageous even with fast-start power stations that supply always takes place with a significant delay. A primary reserve, which can be used virtually without delay, is hardly ever available. Moreover, energy from the primary reserve can be expensive.

The regulation of the power supply mains can be even more demanding by energy consumers, such as elevator installations, which draw larger amounts of energy from or feed such back to the power supply mains. Whereas connection or disconnection of apparatus with low energy consumption is usually uniformly distributed due to the high number or is plannable on the basis of experience this is not the case with elevator installations. Dynamic loads, such as elevator installations, can relatively strongly load the power supply mains selectively at any time of day or time of night. To the extent that, for example, a larger travel group enters different hotels at night time when the mains operator does not expect greater loads, several elevator installations can coincidentally be simultaneously actuated whereby a high loading is abruptly triggered. On the other hand, insofar as an energy excess is present and the elevator installations can feed additional energy back to the power supply mains, this equally should be absorbed by the regulation technology of the power supply mains. It is to be noted that primarily expensive primary reserves may be required to provide compensation for these processes.

The presence of larger energy consumers, such as elevator installations possibly with several individual elevator units, may require a high level of availability of the regulating capacities of the power supply mains. In particular, possibly expensive primary reserves may be provided.

SUMMARY

At least some embodiments allow for control of an elevator installation so as to enable operation optimized in terms of energy and for control of transfer of electrical energy by way of a power supply mains with which at least one elevator installation with at least one elevator unit is connected.

In particular embodiments, a method is provided, which allows the regulating capacities of a power supply mains with which elevator installations are connected to be kept constant or to be reduced. In that case, in particular, the need for primary reserves can be reduced.

Moreover, the stability of the power supply mains, for example of a modern power supply mains (also termed 'smart grid'), can be increased by way of the method described here, particularly in the case of occurrence of transient power fluctuations on the part of the energy suppliers or energy consumers.

In some embodiments, peak loads can be reduced without the services for users of elevator installations being perceptibly restricted.

Some embodiments comprise a method of controlling at least one elevator installation with at least one elevator unit, which is connected with a power supply mains, wherein the elevator installation is controllable by means of an elevator control associated thereto, with consideration of first control information based on local requirements of users. The elevator control receives from the power supply mains second control information containing status data for the power supply mains. The first and second control information is evaluated by the elevator control. The elevator control influences operation, which is determined by the first control information, of the elevator installation in dependence on the second control information so as to enable operation optimized in terms of energy.

In other embodiments, at least one of acceleration of an elevator cage, travel speed of the elevator cage, a start time of a cage journey and parallel operation of several elevator units are influenced. In addition, the elevator control can so influence operation of the elevator installation that an elevator cage executes an empty journey so as to receive electrical energy from the power supply mains and store it in the elevator installation as potential energy or to feed electrical energy to the power supply mains. One or more of these measures can be carried out selectively according to the respective situation, whereby the flexibility of the elevator installation is increased.

A further possible feature is that the potential energy is converted in a power-generating operation of the elevator installation into electrical energy and is either conducted into the power supply mains or an energy storage system is charged. The energy storage system can in addition be charged by the power supply mains. Flexibility can be further increased by these options.

In further embodiments, transfer of electrical energy is controlled by way of a power supply mains, with which at least one elevator installation with at least one elevator unit is connected, which is controllable by means of an associated elevator control with consideration of first control information based on local requirements of the users. In addition, a monitoring unit which ascertains status data for the power supply mains and provides information for the consumers is connected with the power supply mains.

In further embodiments, the monitoring unit creates second control information for the at least one elevator control in dependence on the loading of the power supply mains, in accordance with which the elevator installation is so controlled in correspondence with the first and second control information that the need for regulating energy for the power supply mains is reduced.

At least some embodiments make it possible to use elevator installations connected with the power supply mains and to influence the operation thereof so as to optimize operation of the power supply mains. Through appropriate control of the elevator installations, for example a compound of numerous elevator installations, it is not only possible to avoid load peaks, but also to utilize energy capacities of the elevator installations at points in time in which the power supply mains requires positive or negative regulating energy, which is now made available by the elevator installations harmonized with the power supply mains.

In some cases, energy capacities for the primary reserve are made available by the elevator installations (for example, a group). Positive and negative regulating energy of the elevator installations is thus exchanged with the power supply mains virtually without delay, so that this can be stabilized with response time particularly in critical geographical zones.

In some embodiments, the monitoring unit of the power supply mains uses the elevator installations, which are connected with the power supply mains, in order to reduce the requirement for further regulating energy without this being recognizable by the users of the elevator installations.

The elevator controls provide to the central monitoring unit possibly all operating data such as data with respect to historical, current or future planned energy consumption. The future energy consumption can be determined on the basis of already registered operating data.

In some embodiments, possibly all elevator installations connected with the power supply mains report to the monitoring unit the transportations (journeys) required in accordance with the first control information as well as possibly the correspondingly required energy consumption. As a consequence, the monitoring unit controls the transportations in such a manner that simultaneous starting of several elevators within the power supply mains or parts thereof is avoided. In that case the transportations are distributed in such a manner that uniform loading of the power supply mains takes place over the time periods within which the transportations are to be executed.

Possibly, time windows are provided to which the transportations are distributed in such a manner, possibly with consideration of energy consumption, that a load balance results. For that purpose, time marks can be assigned to the required transportations and reported to the elevator controls, which start the corresponding transportations respectively at the points in time noted by the time marks. With consideration of the energy consumption it can also be provided, for example, that within a time window only one journey with a relatively high energy consumption is carried out or two transportations with a relative low energy demand are carried out.

For the assignment of the time marks the location of the elevator installations is possibly also taken into consideration so that not only time optimization, but also geographical optimization of loading of the power supply mains results. Whereas simultaneous transportations by elevator units at greater geographical spacings are often non-critical, it is possible to avoid a part of the power mains being simultaneously loaded by several elevator installations. In order that the transportations are indeed carried out at the intended points in time, the elevator controls and the monitoring unit preferably employ a common time basis. Through this operation, which is 'conserving' for the power supply mains, of the elevator installations it is possible to avoid disturbances and failures within the power supply mains which in a given case may already be strongly loaded.

Coincidental peak loads which could otherwise be caused by elevator installations are avoided by the stated measures. This can be taken into consideration in the planning of the regulating capacity of the power supply mains. In particular, risk factors which can form an element in the linking of coincidentally simultaneously occurring and unpredictable circumstances, which can from time to time disturb the operation of power supply mains, are thereby also eliminated.

As mentioned, the energy capacities of the elevator installations are utilized in order to help ensure availability of the elevator installations and/or in order to reduce the need for regulating energy. On the basis of the examples of the method described here it is possible to provide compensation for transient disturbances in the mains, such as temporary failures of individual energy suppliers or peak loads, with minimal influencing of the operation of the elevator installations. The compound of elevator installations is used as energy store and power supplier, which under the control of the monitoring unit exchanges regulating energy with the power supply mains.

In a phase in which an energy excess is present, the elevator installations are in one embodiment possibly brought to a 'higher' energy level so that potential energy or stored electrical energy can be called up if needed. For example, the passenger cage, which is fastened to an end of a support means and which in the empty state is lighter than the counterweight fastened to the other end of the support means, is moved downwardly in the end position. In this phase the elevator control typically has a high level of autonomy so that it can control the processes autonomously.

Insofar as in another phase at high loads of the power supply mains an energy bottleneck is signaled by means of the second control information the elevator control possibly determines the potential or electrical energy stored in the elevator units and/or the energy requirement for the transportations demanded by the users. As a consequence, the elevator units are controlled in such a manner that, for example, initially the transportations are executed, which allow power-generating operation of the elevator installation or which have the lowest energy consumption. Parallel operation of the elevator units can also be temporarily restricted by the elevator control. Moreover, it is possible to change the weight limits for the elevator cages so as to reduce loadings. In this phase the elevator control possibly has reduced autonomy, so that the monitoring unit can carry through operating restrictions with little delay.

In the case of failure of an energy supplier or in the case of peak loading of the power supply mains, in a further phase an energy requirement is signaled by means of the second control information, in accordance with which the electrical energy stored in the elevator units is called up as needed and fed to the power supply mains. If the stored energy is present as potential energy, this is converted into electrical energy and fed to the power supply mains. In this phase the elevator control possibly has only minimal or no autonomy, so that the monitoring unit can immediately call up the regulating energy from the elevator installations.

After signaling of an energy requirement, for example, empty journeys of the elevator units are automatically performed, i.e. selected elevator cages are respectively moved to the uppermost story. A compound of elevator installations can therefore be transferred to power-generating operation virtually without delay so as to make available positive regulating energy virtually free of delay. The change in operating mode is, however, hardly perceptible by users of the elevator installations.

The time within which the compound of elevator installations exchanges regulating energy with the power supply mains can be used by the mains operator so as to call up secondary energy reserves from the energy suppliers. Compensation for corresponding regulating delays is in that case provided by the rapid use of the regulating energy supplied by the elevator installations.

Possibly, an individual operation protocol establishing the access authorizations of the monitoring unit is created for each elevator installation. An agreement which regulates access rights can be set up between the operator of the power supply mains and the operator of the elevator installations or of the compound of elevator installations. The priorities of the first and second control information can in that case be fixed. For example, the second control information can be assigned a higher priority so that the operator of the power supply mains obtains direct access to the stored energy reserves and can call these up without delay. The elevator control in this case ensures that all safety relevant conditions are fulfilled. Conversely, the operator of the elevator installations can prescribe rights and reservations in the operation protocol so as to ensure help performance of particularly important transportations. An industrial undertaking, a hotel and a hospital will therefore usually use different operation protocols. The mains operator can, however, grant reductions to the operators of the elevator installations on the basis of the ceded rights. For example, more favorable tariffs or repayments are offered. The elevator controls therefore follow the fixed operation protocol in the execution of the current first and second control information.

A part of the operation protocol can in that case be jointly fixed by the operator of the power supply mains and the operator of the elevator installation. A further part of the operation protocol can be defined solely by the operator of the elevator installation. In particular, the operation of the elevator installation can also be fixed with consideration of only commercially obligatory second control information. It is possible to communicate to the elevator control by the second control information current or future tariffs, with the consideration of which control of the elevator installation can be carried out.

In the case of high tariffs the energy consumption is, in one embodiment, reduced. For this purpose there is possibly provided in the elevator installation an energy-saving mode which can be switched on and in which the acceleration and travel speed of the elevator cage are limited. Moreover, provision can be made for journeys to be carried only after a specific delay. Moreover, parallel operation of elevator units can be precluded. The elevator installation is therefore again controlled on the basis of the second control information, wherein the control takes place indirectly and with a priority which is established by the operator of the elevator installation. The solution described here can therefore give the operator of the elevator installation flexibility and at the same time the possibility of reducing energy costs.

With consideration of the communicated tariffs it is also possible to store electrical energy when energy costs are low and to deliver or use it again when the tariffs are higher. For example, the elevator installations are, in the case of low tariffs during night time, brought to the highest energy level and/or energy storage systems which are present are charged so that the stored energy can be used at the time of increased tariffs during the morning hours or can be delivered again with profit.

The secondary control information can thus be used for direct and indirect control of the elevator installation with selectable priority.

The monitoring unit of the power supply mains thus fulfills the functions of a central energy management system, whereas the elevator control and/or a separate system, which is or are allocated to an elevator installation, forms or form a local energy management system which minimizes the energy consumption and the energy costs or even manages to obtain a profit.

In further embodiments the elevator units of the elevator installations are provided with at least one energy storage system or are coupled to such. The energy storage system can thus be regarded as a part of an elevator installation or as a system arranged separately from an elevator installation. The energy storage system can be arranged, depending on the respective design, at different locations, for example in the elevator shaft or at other locations in a building. Energy may be stored in the energy storage system as electrical energy (for example with at least one capacitor), mechanical energy (for example with at least one flywheel) or chemical energy (for example with at least one battery, hydrogen or redox flow cell). In the following, the energy storage system includes at least one battery, accumulator or capacitor or a combination of these stores. The energy storage system is electrically connected with the elevator control and the power supply of the elevator installation. The energy storage system can be charged in different ways, for example it can be charged by the energy supply mains, the elevator unit during power-generating operation and/or an alternative energy source (for example photovoltaic installation or wind power installation). The energy storage system can also be discharged in different ways, i.e. stored electrical energy can be fed to the power supply mains and/or used for operation of the elevator installation or other consumers in a building, for example during a power failure. Use, which is respectively optimized on an energy basis, of the energy storage system can be determined by an intelligent energy management system.

BRIEF DESCRIPTION OF THE DRAWINGS

Different aspects of the disclosed technologies are explained in more detail in the following in conjunction with the figures, in which.

DETAILED DESCRIPTION

Figure 1:
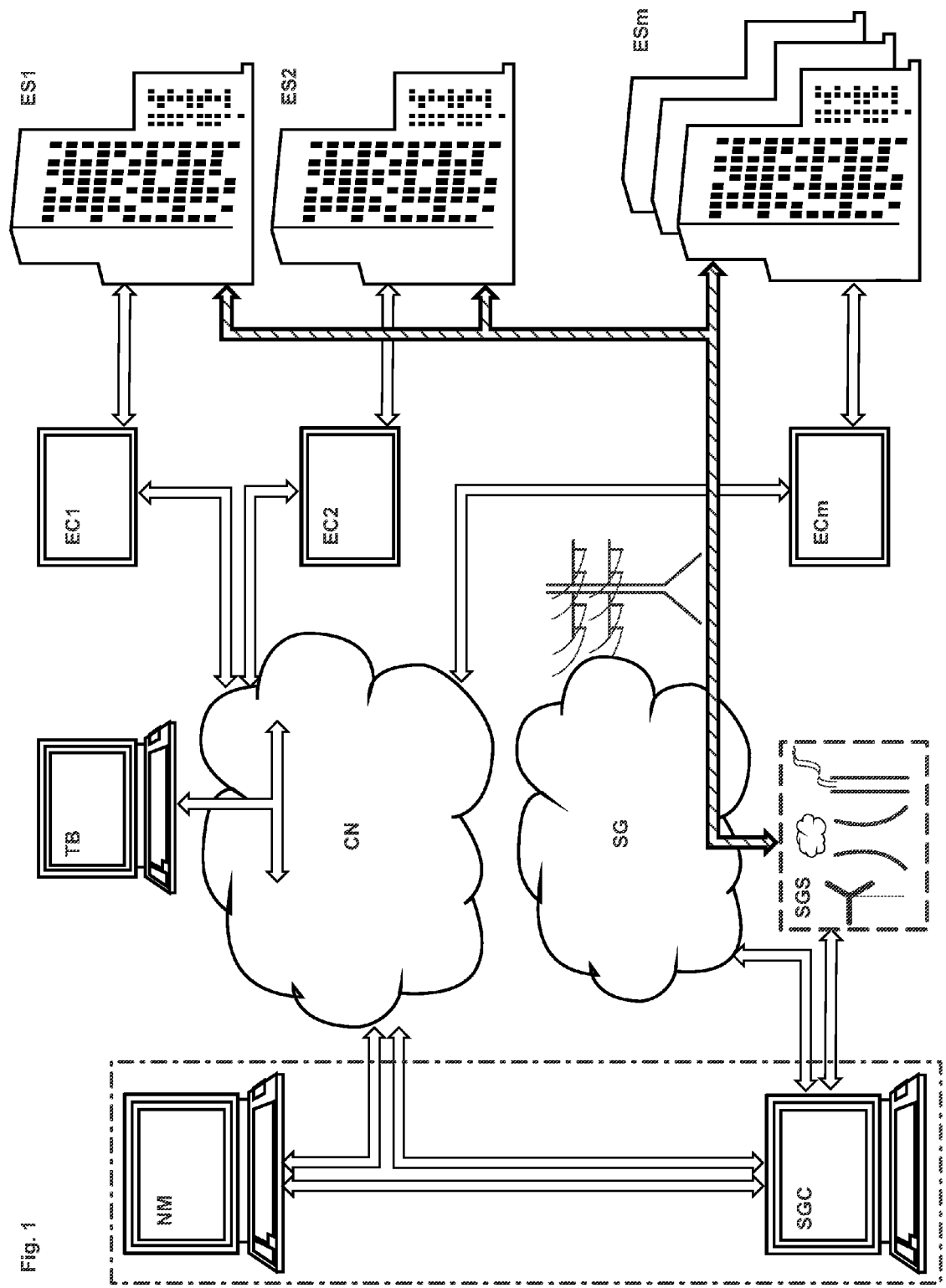
FIG. 1 shows a schematic embodiment of a power supply mains, with which energy suppliers and several elevator installations with an associated elevator control are connected, which communicate by way of a communications network with a monitoring unit monitoring the status of the energy supply mains.

FIG. 1 shows a schematic embodiment of a power supply mains SG, with which energy suppliers/power suppliers SGS and several elevator installations ES1, . . . , ESm, which are installed in buildings, each connected with an own elevator control EC1, . . . , ECm. In FIG. 1 the elevator controls EC1, . . . , ECm are, for simplification, shown outside the buildings; however, it will be apparent that the elevator controls EC, . . . , ECm are arranged in the buildings. The elevator controls EC1 . . . , ECm communicate by way of a communications network CN with a monitoring unit NM which monitors the status of the power supply mains SG. For that purpose, the monitoring unit NM can directly access measurement sensors which supply measurement magnitudes from the power supply mains SG. These measurement sensors are arranged in the vicinity of the buildings or in the buildings and coupled to power mains internally of the buildings. The elevator installations ES1, . . . , ECm are in turn connected therewith. The measurement sensors have a 'smart meter' functionality. This 'smart meter' functionality can be implemented as an independent unit ('smart meter') or in an elevator control EC1, . . . , ECm. In the embodiments described here the 'smart meter' functionality is implemented in an elevator control EC1, . . . , ECm; a separate 'smart meter' is therefore not shown in the figures.

In addition, the monitoring unit NM can exchange bidirectional data with the elevator controls EC1, . . . , ECm and obtain information therefrom, for example data with respect to energy consumption. In one embodiment the monitoring unit NM can also dispatch control information to the elevator controls EC1, . . . , ECm, which is explained in more detail in the following. Moreover, the monitoring unit NM can take over data from a mains control SGC controlling the power supply mains SG. The monitoring unit NM and the mains control SGC can also be combined into a unit.

In one embodiment the energy consumption and a traffic situation are determined by a method such as described in, for example, WO 2010/086290. There, at least one energy measuring device is provided for detection of energy consumption, which device is positioned locally at the energy consumer. In order to detect the traffic situation, signals from the elevator installation are picked up and evaluated. A sensor picks up, for example, cage-specific data such as, for example, loading of an elevator cage, or signals from a destination call control and/or elevator control relating to a number of calls per unit of time are picked up. The detected energy consumption and/or the detected traffic situation is or are stored in a computer-readable data memory so that the stored data can be interrogated for later use. An evaluating device can determine and/or simulate the energy consumption or traffic situation so that a future energy consumption value can be determined by the simulated energy consumption and/or the simulated traffic situation even before the elevator installation is installed. The determined energy consumption value is determinable for the most diverse reference magnitudes, for example as an energy consumption value for exactly one energy consumer or as an energy consumption value for exactly one energy consumer and for a specific unit of time. Coming into consideration as further reference magnitudes are: the elevator installation, the elevator installation and a unit of time, the elevator installation and a traffic situation, an elevator cage, the elevator cage and a unit of time. Similarly, an individual passenger, a passenger and a unit of time or a passenger and a traffic situation can be utilized as reference magnitudes, so that specific energy consumption values for the transport of an individual passenger are available. Also correspondingly coming into consideration as basis are an energy consumption per call, per journey, per journey and unit of time, per journey and traffic situation or an energy consumption per zone.

Possibly, all data required for control of an intelligent power mains can be formed and provided in the monitoring unit NM.

Connection of the power supplier SGS, which produces electrical energy in different ways, with the power supply mains SG is controlled by the mains control SGC, which is controlled by the mains operator.

Through the communication with the mains control SGC and through evaluation of the data supplied by the measurement sensors ('smart meter' functionality) the monitoring unit NM recognizes failures of energy suppliers, energy bottlenecks within the power supply mains SG, which are attributable to failures of energy suppliers or to increased energy extraction by consumers. The monitoring unit NM possibly records the load curve for all significant parts of the power supply mains. The energy supplies curve of the energy suppliers SGS is preferably also monitored. The monitoring unit NM can communicate with the energy suppliers SGS by way of the mains control SGC and request energy supplies over the longer term or shorter term or cause exchange of regulating energy. In addition, the monitoring unit NM possibly obtains prognoses for future energy supplies so as to ensure stable operation of the power supply mains SG.

It was previously mentioned that in the case of connection of numerous energy suppliers, the power supplies of which are obtained from, for example, renewable energies, instabilities requiring interventions of the monitoring unit NM are more likely to arise. In the case of failures of individual energy suppliers SGS multiple regulating processes are therefore to be undertaken. In that case there is the risk that these regulating processes are not carried out sufficiently rapidly or the required capacities are not available.

FIG. 1 illustrates that at the consumer side numerous larger power consumers, particularly elevator installations EC1, ..., ECm are connected with the power supply mains SG. Consequently, risks also result at the consumer side particularly when the power supply mains SG has only a low level of stability. Through the method described in the following the elevator installations EC1, ..., ECm, which temporarily have a relatively high energy requirement and thus traditionally represent a form of 'operating risk' for the power supply mains SG, are controlled in such a manner that the stability of the power supply mains SG is not impaired, but additionally improved.

Figure 2:
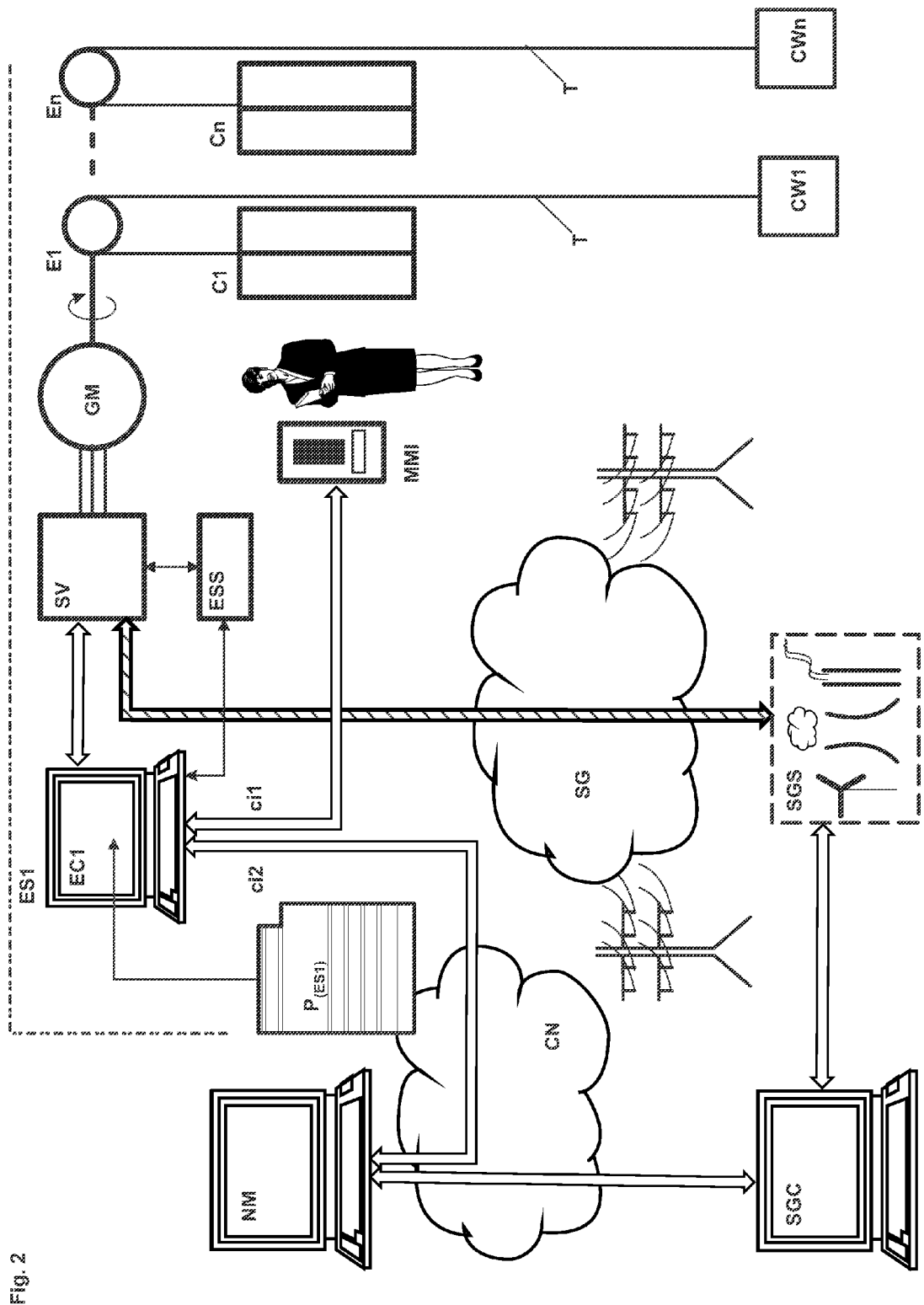
FIG. 2 shows the power supply mains with an elevator installation comprising several elevator units.

FIG. 2 shows the power supply mains SG of FIG. 1 with a schematically illustrated elevator installation ES1 comprising a plurality of elevator units E1, ..., En. In another embodiment the elevator installation ES1 can comprise only one elevator unit E1.

Figure 3:
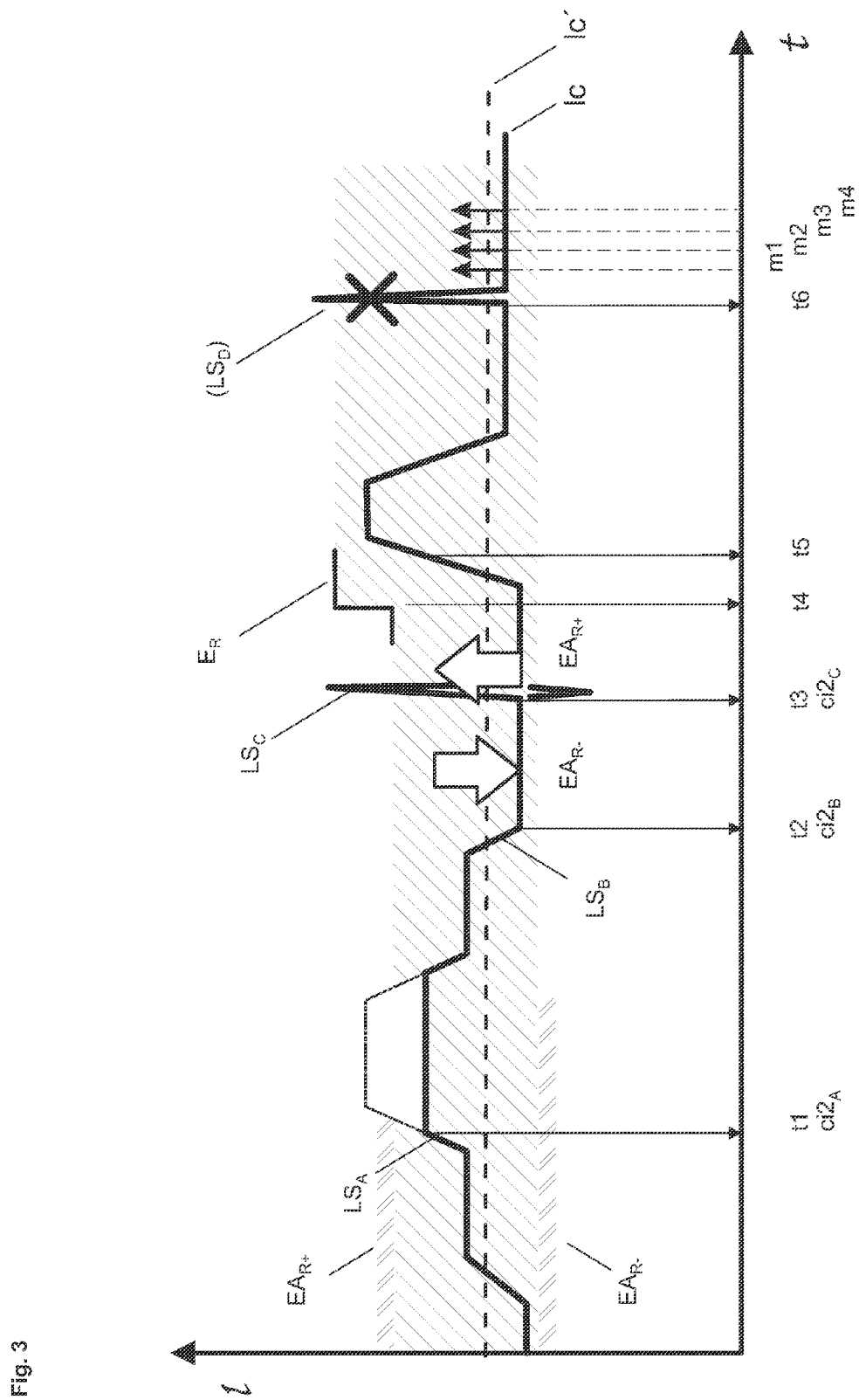
FIG. 3 shows a diagram with an exemplifying load plot of the power supply mains with load situation shown by way of example.

FIG. 3 shows a diagram with an exemplifying load plot $1c$ of the power supply mains SG with load situations $LS_A$, $LS_B$, $LS_C$ and $LS_D$ as a function of time t illustrated by way of example. In addition, the ideal load plot $1c'$ is illustrated, running horizontally parallel to the abscissa (t) in the case of constant loading of the power supply mains SG. When the load is constant, regulation of the power supplied by the energy suppliers SGS is not required. Contrary hereto, the load plot $1c$ shows that the loading of the power supply mains changes in the course of the day, since consumers are connected and disconnected. It will be apparent that the load plot in another embodiment can have a different course with different load situations.

A first load situation $LS_A$ is illustrated for the time instant t1, within which an increased loading arises. A second load situation $LS_B$ is illustrated for the time instant t2, within which the load was strongly reduced and a power excess of the energy suppliers is present. In addition, a third load situation $LS_C$, i.e. a load peak, caused by simultaneous connection of several larger loads with the power supply mains SG is indicated. Differences thus arise between the power available and the power needed by the consumers, compensation for which is provided by the use of regulating energy $E_R$. The mentioned load situations are discussed in the following.

The regulating range of the power supply mains SG is illustrated in the diagram of FIG. 3, i.e. the range which comprises positive regulating energy $E_{R+}$ and negative regulating energy $E_{R-}$. The amount of available regulating energy $E_R$ can change in the course of the day. At the time instant t4 the potential of positive regulating energy $E_{R+}$ increases, which is taken into consideration by the method described here. Since at the time instant t5 more regulating energy $E_{R+}$ is available compensation for higher loading can easily be provided. By contrast thereto the load increase at the time instant t1 is rather more critical, since this runs in the limit region of the available regulating energy $E_R$.

In addition, a fourth load situation $LS_D$ is illustrated in the diagram of FIG. 3, which situation is discussed in the following and is in principle avoided by use of the method and with the elevator installation ES1 of FIG. 2 or a compound of elevator installations ES1, ..., ESm according to FIG. 1, for which reason the illustrated load peak is crossed out.

FIG. 2 shows by way of example an embodiment of an elevator installation ES1 which is possibly integrated into the compound of several elevator installations ES1, ..., ESm according to FIG. 1. The elevator installation ES1 here comprises, by way of example, a plurality of elevator units E1, ..., En, which each comprise a respective elevator cage C1, ..., Cn and a respective counterweight CW1, ..., CWn, which are connected together by way of a support means T (cable or flat belt). The cages C1, ..., Cn are available for vertical transportations which users can demand by command inputs (for example input of a call or a destination story, in each instance from a starting story) at an interface MMI, which correspondingly transmits first control information ci1 to the elevator control EC1. The command input can be effected in traditional manner by actuation of push buttons (for example 'on'/'off' buttons or button field) or by use of chip cards or smart cards in order to thereby input a so-called destination call, for example, in elevator installations with a destination call control (for example a SchindlerID or PORT control of the company Schindler).

It will be recognized that the embodiments described here are not limited to elevator installations with a counterweight and a support means. In another embodiment the elevator installation ES1 can be so configured that a counterweight is not needed, for example if a winch or a self-climbing elevator cage is used. In a further embodiment the elevator cages can be self-climbing; in such an elevator installation there is therefore no need for support means.

FIG. 2 additionally shows an energy store system ESS, which is coupled to the power supply unit SV so as to be charged by this or to deliver energy thereto. The energy storage system ESS is additionally coupled to the elevator control EC1 so that the elevator control EC1 can monitor a charge state of the energy storage system ESS. Depending on the respective local conditions the energy storage system ESS can be connected with one or more other local energy generators, for example a photovoltaic installation, a wind power installation (wind wheel) or a combination of such installations. The energy storage system ESS in such cases also stores the electrical energy generated by these installations. The energy storage system ESS can be designed in various ways, but it can be a storage system for electrical energy. In one embodiment such a storage system contains one or more batteries, accumulators or capacitors. In principle, the energy storage system ESS can also store mechanical energy, for example by means of a flywheel. The energy storage system ESS can serve the purpose of reducing possibly arising energy peaks or supplying energy during a power failure so that during this time, for example, evacuation journeys are possible or the elevator operation can be maintained. In addition, the energy storage system ESS can also serve the purpose of supplying important power consumers in the building during a power failure.

On the basis of first control information ci1 the installation control EC1 controls a power supply unit SV (for example frequency converter (ACVF)), which is connected with a drive unit GM which in some designs can operate not only as a motor (motorized operation), but also as a generator (generator operation). Through switching-on of electrical power the drive unit GM is activated, which as a consequence moves the associated cage C1 upwardly or downwardly. The first control information ci1 can contain tariff, status or other information (for example boarding story, destination story), or a combination of these items of information. For the sake of clarity the drive unit GM is shown in FIG. 2 separately from a support means guide. However, in some cases the drive unit GM and the support means guide can be integrated in a unit, for example a rotor axle of the drive unit can have one or more drive zones which act on the support means T in order to move the elevator cage C1 up or down. Only one drive unit GM is shown in FIG. 2, but in some embodiments each elevator unit E1, . . . , En has a drive unit GM.

The installation control EC1 by itself or in combination with a local elevator energy management system evaluates this information so as to inter alia, thereby optimize the operation of the elevator installation ES1 with respect to energy consumption. The energy consumption or power consumption of the elevator installation ES1 can be changed and optimized by, for example, one or more of the following measures: the travel speed and/or the acceleration of the cage C1 can be reduced, the start (or start time instant) of a journey can be delayed in time or selective empty journeys can be executed. Selective empty journeys can serve the purpose of releasing potential energy stored in the elevator installation ES1 (i.e. the heavier counterweight CW1 is in the uppermost story). In generator operation the heavier counterweight CW1 draws the lighter elevator cage C1 upwardly and the electrical energy generated in that case is stored in the power supply mains SG so as to obtain therefore a reimbursement for supplied energy or to take it from there so as to exploit, for example, a favorable tariff for withdrawn energy. In order to exploit the latter measure, the elevator installation ES1 has, in one embodiment, at least one energy storage system ESS. The energy storage system ESS can, for example, be charged by the power supply mains SG at the time of a favorable tariff and, if an appropriate reimbursement model is present, feed energy back into the power supply mains SG at the time of high tariffs. Alternatively thereto the stored energy can also be used for the purpose of supplying the elevator installation ES1 with energy at the time of high tariffs or a power failure and thus maintaining operation of the elevator installation ES1.

The installation control EC1 can also be designed as a group control controlling more than one elevator unit, thus a group of elevator units E1, . . . , En. The control of this group is carried in known manner by the group control, for example the group control allocates a transport wish ('call') of a person to one of the elevator units E1, . . . , En, for example to one with an elevator cage C1 which currently has the shortest distance from the boarding story. The group control can, in combination with an energy management system, implement the aforementioned measures for optimization of the energy or power consumption. In addition to these measures the group control can implement 'group specific' measures so as to optimize operation of the group, for example one or more of the following measures: selective triggering of simultaneous motorized and power-generating journeys, delay in time of the starting time instant of individual elevator units E1, . . . , En, adaptation of the cage load by a selective distribution of persons to several elevator units E1, . . . , En or selection of individual elevator units E1, . . . , En which have executed empty journeys in order to feed energy to or take energy from the power mains, or to charge an energy storage system ESS.

The different measures can be implemented in the installation control EC1, the energy management system or a combination of installation control EC1 and energy management system. The installation control EC1 has a processor/computer with an associated computer-readable data memory. The data memory stores a computer program, which can be executed by the processor, with program code commands serving for carrying out the various measures.

In one embodiment the elevator installation ES1 is initially in normal operation, i.e. no requirement from the mains control SGC with respect to load disconnection is present and the tariff for energy is at the normal level. In this normal operation the energy storage system ESS, if it is not already charged, is charged with low power so that its charge state lies at, for example, approximately 70% of maximum capacity.

Contrary hereto, a special operation is present when the mains control SGC requires load disconnection, for example at a time instant at which mains loading is relative high and consequently the tariff can be high. In such a special operation the charging of the energy storage system ESS is interrupted or not even started. In addition, the acceleration or speed of the elevator cage C1, . . . , Cn or both can be reduced to such an extent that the entire power necessary for elevator operation can be withdrawn from the energy storage system ESS. In this case the elevator installation ES1 is disconnected, from the viewpoint of the mains control SGC, since it does not remove energy from the power supply mains SG.

A threshold value for the tariff can be fixed in the elevator installation ES1 or in the energy management system. If the tariff exceeds this threshold value, it can be defined that the energy storage system ESS is discharged to a lower limit and, in particular, so that the residual energy in the energy storage system ESS suffices for further elevator journeys. However, an elevator journey or an empty elevator journey to the uppermost story can also be triggered. Since an elevator installation is usually dimensioned such that the counterweight CW1 is heavier than an empty cage C1, additional energy can be obtained thereby with an empty cage and fed to the power supply mains SG.

The mains control SGC can also transmit a load connection enquiry to the elevator installation ES1. If the mains control SGC transmits such a load connection enquiry or if the tariff sinks below a fixed threshold value for the tariff, which, for example, can be the same as the aforementioned threshold value, the energy storage system ESS is charged with a greater amount of power, for example almost to maximum capacity. The degree of charging can in that case be so selected that the energy storage system ESS in the case of a following journey is not over-charged if the elevator installation ES1 is in power-generating operation. Additionally or alternatively an elevator journey or an empty elevator journey to the lowermost story can be triggered. In the case of an empty cage C1 additional electrical energy can thereby be consumed, which is needed for the purpose of moving the lighter cage C1 downwardly against the heavier counterweight CW1.

The described measures for optimization of the operation of an elevator installation can also be used in the compound, which is shown in FIG. 1, of several elevator installations ES1, . . . , ESn. In such a compound in one embodiment all participants (i.e. all elevator installations ES1 . . . , ESn) respectively report the instantaneous status thereof and the instantaneous power take-up/delivery thereof continuously to a central control unit, for example the monitoring unit NM. A service provider, for example one or more of the energy suppliers SGS, can then offer possible regulating reserves on the market and centrally control the power plot of the compound. New tariff models can thus be developed for the individual elevator installations ES1, . . . , ESn. The compound power can be influenced by the following measures: variation of the ratio of motorized to power-generating journeys, reduction/increase of travel speed, reduction/increase of acceleration, delaying time of start of travel of cages C1, . . . , Cn of individual elevator installations ES1, . . . , ESn, triggering of selective empty journeys so as to feed energy to or withdraw energy from the mains, and adaptation of cage load through selective distribution of persons (in the case of group controls).

The elevator installation ES1 can be operated in different operating modes. In a first operating mode an exclusively motorized operation takes place for which energy is taken from the power supply mains SG. Insofar as potential energy is stored in the elevator units E1, . . . , En (i.e. an elevator cage C1 is in the lowermost story), the elevator installation ES1 can in the second operating mode be operated purely with power generation. For that purpose the elevator units E1, . . . , En, in which energy is stored, are set in motion and the drive unit GM operated as a generator, which feeds energy back to the power supply mains SG by way of the power supply unit SV or charges the energy storage system ESS. In addition, a mixed operation is possible in which individual elevator units E1, . . . , En deliver energy and others take up energy.

It will be apparent that not every one of the described measures for optimization of the operation of an elevator installation ES1, . . . , ESm or every operating mode has to be implemented in an elevator installation ES1, . . . , ESm. The individual measures and operating modes can—depending on the respective circumstances—be implemented almost independently of one another in an elevator installation ES1, . . . , ESm.

It is additionally shown in FIG. 2 that the elevator control EC1 communicates by way of a communications network CN with the monitoring unit NM of the power supply mains SG and obtains second control information ci2 therefrom. This control information ci2 is established by the monitoring unit NM in dependence on the status of the power supply mains SG.

For processing of the first and second control information ci1 and ci2 there can be set up between the operator of the elevator installation ES1 and the operator of the power supply mains SG possibly a symbolically depicted protocol $P_{ES1}$ in which the priorities of the first and second control information ci1, ci2 are fixed. According to protocol $P_{ES1}$ second control information ci2, which relates to an emergency case of the power supply mains SG, can be handled with priority and executed without delay. On the other hand, one of the elevator units can be assigned highest priority in, for example, a hospital and is reserved for emergency situations. In addition, financial aspects such as reimbursements and advantageous tariffs can be taken into consideration in the determination of the protocol $P_{ES1}$. Thus, the method described here allows advantageous operation of each elevator installation ES1, . . . , ESm, which is individually adapted to the needs of the user, and simultaneous use of the elevator installation to a stabilization of the power supply mains SG.

An embodiment of the method is explained in more detail in the following by way of the diagram of FIG. 3. The regulating energy $E_R$ available within the power supply mains SG is illustrated in the diagram with simple hatching. Illustrated below and above the regulating band are the additional positive regulating energy $EA_{R+}$ as well as the additional negative regulating energy $EA_{R-}$ made available by the elevator installations ES1, . . . , ESn. These additional components of the regulating energy $E_R$ are comparatively small, but have the advantage that they are usable decentrally and very rapidly in order to stabilize the power supply mains SG. The positive and negative regulating energies $EA_{R+}$, $EA_{R-}$ of the elevator installations ES1, . . . , ESn are therefore to be regarded as the very rapidly usable primary reserves, which are particularly important for stabilization of the power supply mains SG. The otherwise slow regulating processes in the power supply mains SG can thereby be bridged over and mains fluctuations avoided.

It is shown in the diagram that the monitoring unit NM ascertains a strong rise in the load at the time instant t1. In addition, it is established that the load approaches the limit of the regulating energy or the regulating power, for which reason the monitoring unit NM transmits control information $ci2_A$ to the elevator controls EC1, . . . , ECm of the elevator installations ES1, . . . , ESm and signals an energy bottleneck to these. With consideration of the operation protocol $P_{ES1}$ the second control information $ci2_A$ can now be handled with, for example, increased priority, i.e. priority over the first control information ci1. In this case the control information $ci2_A$ is interpreted as a control command to be executed as soon as possible. The elevator control EC1, . . . , ECm now determines the energy stored in the elevator units E1, . . . , En (electrical energy stored in the energy storage system ESS or energy in the form of potential energy) and/or the energy requirement for the transportations/journey required by the users and controls the elevator units E1, . . . , En in such a manner that, for example, the transportations are firstly performed which allow power-generating operation of the elevator installations ES1, . . . , ESm or have the lowest energy requirement. Additionally or alternatively the monitoring unit NM or the elevator control EC1, . . . , ECm can temporarily restrict parallel operation of the elevator units E1, . . . , En and stop one of the elevator units E1, . . . , En. It is therefore effected by the second control signals $ci2_A$ for the load situation $LS_A$ ascertained at the time instant t1 that the elevator installations ES1, . . . , ESm are operated sparingly. It is symbolically illustrated in FIG. 3 that on the basis of the mentioned measures it is possible to avoid exhaustion of the reserves of the regulating energy $E_R$ of the power supply mains SG.

With respect to the time instant t2 denoted in the diagram of FIG. 3 the monitoring unit NM ascertains a low loading of the power supply mains SG and by means of the second control information $ci2_B$ signals an energy excess. On receipt of this information, which can be handled with reduced priority, the elevator units E1, . . . , En are moved by the elevator control EC1, . . . , ECm into a position in which they have an increased potential energy or absorb negative regulating energy $E_{R-}$.

Two anomalies, which can occur alternatively, are recorded for the time instant t3 in the diagram. On the one hand, in the case of the load situation $LS_C$ a load peak or also a failure of an energy supplier SGS can arise, for which reason the power supply mains SG threatens to collapse. In this case the monitoring unit NM signals, by the second control information $ci2_C$, an energy requirement, in accordance with which each addressed elevator control EC1, . . . , ECm determines the potential energy stored in the elevator units E1, . . . , En and controls the elevator units E1, . . . , En possibly with highest priority in such a manner that stored potential energy is released and by power-generating operation of the associated drive units GM is fed back to the power supply mains SG in the form of electrical energy. For power-generating operation the drive units GM or the three-phase motors, asynchronous motors or synchronous motors used therein are operated in known manner as three-phase generators.

In the diagram of FIG. 3 it is shown by arrows that the elevator installations ES1, ..., ESm after the time instant t2 store negative regulating energy $EA_{R-}$ and after the time instant t3 deliver positive regulating energy $EA_{R+}$ so as to provide compensation for peak loading or failure of the power suppliers SGS.

The mode of operation of the elevator installations ES1, ..., ESm is therefore selected with consideration of the status of the power supply mains SG for stabilization thereof. During bottlenecks, loadings of the power supply mains are avoided or limited. During an energy excess energy is stored and not released. As a result, from the viewpoint of the operator of the power supply mains the connected elevator installations ES1, ..., ESm are advantageously integrated into the regulating system of the power supply mains SG. The operation of the elevator installations ES1, ..., ESm is thus harmonized with the power supply mains SG.

It is additionally shown in the diagram of FIG. 3 that the monitoring unit NM in the case of provision of the second control information ci2 possibly takes into consideration further conditions. The monitoring unit NM possibly registers the course of the available regulating energy $E_R$. To the extent that the potential of the regulating energy $E_R$ increases, it is possible to dispense with, in the case of increased loading of the power supply mains SG, transfer of the elevator installations ES1, ..., ESm to another mode of operation. Instead, the energy supply of one of the power stations SGS is increased.

At the time instant t4 illustrated in the diagram the monitoring unit NM has ascertained that the capacity of the regulating energy $E_R$ has, for example, increased in steps due to connection of a power station SGS. At the time instant t5, at which the same load rise as at the time instant t1 was again ascertained, the monitoring unit NM therefore dispenses with the supply of the same second control information ci2. The monitoring of the status of the power supply mains SG therefore possibly comprises not only direct monitoring of the loading of the power supply mains SG, but also the status of the power suppliers SGS as well as corresponding energy prognoses.

In the diagram of FIG. 3 there is additionally illustrated at the time instant t6 a process which can occur in conventionally operated power supply mains and elevator installations ES1, ..., ESm operated independently of one another. In that case there is a relatively high level of probability that elevator installations ES1, ..., ESm are simultaneously placed in operation at corresponding intervals in time, for which reason the load peak shown in FIG. 3 could arise at the time instant t6, due to which the power supply mains SG is destabilized at least in a sub-range.

However, in an embodiment it is provided that such a peak loading cannot even occur, for which reason the load peak at time instant t6 is shown crossed out. In particular, by way of the method it is provided that the elevator controls EC1, ..., ECm report to the monitoring unit NM the transportations required in accordance with the first control information ci1 as well as possibly the associated energy requirement. The monitoring unit NM registers the required transportations and sets up a plan for execution thereof by which freeing of the required transportations is provided in such a manner that a balanced energy consumption results and load peaks are avoided.

The monitoring unit NM possibly assigns time marks m1, ..., m4 to the required transportations and reports these to the elevator controls EC1, ..., ECm. The transportations are consequently performed in distribution to the time marks m1, ..., m4 established by the monitoring unit NM, for which reason peak loadings due to coincidental synchronous start-up of the elevator installations ES1, ..., ESm can be avoided. In order that the transportations are actually performed at the time marks m1, m2, ..., m4 established by the monitoring unit NM use is possibly made of the same time basis and a common time cycle by the monitoring unit NM and the elevator controls EC1, ..., ECm.

Time marks can be communicated to the elevator installations ES1, ..., ESm not only for execution of load procedures, but also for execution of power-generating procedures, such as empty journeys for delivery of potential energy. In that case, provision can be made for a first elevator installation ES1 to execute a passenger transport and a second elevator installation ES2 to execute an empty journey for compensation for the energy consumption.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. I therefore claim as my invention all that comes within the scope and spirit of these claims.

I claim:

1. A method for controlling an elevator installation, the elevator installation comprising an elevator unit connected to a power supply mains, a monitoring unit being coupled to the power supply mains, the elevator installation being controllable by an elevator control based on first control information, the first control information being based on local requirements of users, the method comprising:
   receiving, using the elevator control, second control information from the power supply mains, the second control information comprising status data for the power supply mains;
   evaluating the first and second control information using the elevator control;
   operating the elevator installation using the elevator control, the operating being based on the first and second control information;
   creating the second control information using the monitoring unit, the second control information being based on a loading of the power supply mains; and
   sending the second control information from the monitoring unit to the elevator control, regulating energy for the power supply mains being reduced.

2. The method of claim 1, the operating the elevator installation comprising selecting an acceleration of an elevator cage, a travel speed of an elevator cage, a start time instant of a cage journey, or a parallel operation of a plurality of elevator units.

3. The method of claim 1, the operating the elevator installation comprising:
   executing an empty run with an elevator cage;
   receiving electrical energy from the power supply mains; and
   storing the received electrical energy into the elevator installation as potential energy.

4. The method of claim 3, the operating the elevator installation further comprising:
   converting the potential energy into further electrical energy in a power-generating operation of the elevator installation; and
   feeding the further electrical energy in the power supply mains or into an energy storage system.

5. The method of claim 4, the energy storage system being coupled to the power supply mains.

6. The method of claim 1, the operating the elevator installation comprising:
   executing an empty run with an elevator cage; and
   feeding electrical energy generated from executing the empty run with the elevator cage to the power supply mains.

7. The method of claim 1, further comprising:
   verifying the first and second control information using the elevator control;
   creating a priority list based on an operation protocol; and
   executing requests based on the priority list, the requests having been transmitted based on the first and second control information.

8. The method of claim 1, the operating the elevator installation resulting in the elevator installation feeding further regulating energy to the power supply mains.

9. The method of claim 1, the operating the elevator installation resulting in the elevator installation receiving further regulating energy from the power supply mains to stabilize the power supply mains.

10. The method of claim 1, the second control information indicating an energy excess in case of low loading of the power supply mains, the method further comprising moving the elevator unit into a position of increased potential energy for the elevator unit.

11. The method of claim 1, the second control information indicating an energy bottleneck in case of high loading of the power supply main, wherein the elevator unit is controlled by at least one of:
   executing transportation of the elevator unit to allow power-generating operation of the elevator installation;
   executing transportation of the elevator unit, the elevator unit having a lower energy consumption than another elevator unit;
   restricting parallel operation of the elevator unit and another elevator unit; and
   changing the weight limit for the elevator unit.

12. The method of claim 1, the elevator installation further comprising an additional elevator unit, the method further comprising temporarily restricting, using the elevator control, parallel operation of the elevator unit and the additional elevator unit.

13. The method of claim 1, the second control information indicating an energy requirement in case of a failure of an energy supplier or in case of peak loading of the power supply mains, the method further comprising determining, using the elevator control, the potential energy stored in the elevator unit.

14. The method of claim 13, further comprising feeding energy to the power supply mains by performing an empty run of the elevator unit.

15. The method of claim 1, further comprising another elevator installation being controllable by another elevator control, the elevator control and the another elevator control being coupled to the monitoring unit, the method further comprising coordinating, using the monitoring unit, elevator trips operated by the elevator control and the another elevator control, the elevator trips being coordinated to minimize energy consumption from the power supply mains.

16. The method of claim 1, the second control information comprising a permissible energy consumption or a current applicable energy consumption tariff.

17. The method of claim 1, further comprising:
   reporting stored energy reserves to the monitoring unit using the elevator control; and
   controlling the power supply mains, using the monitoring unit, based on the reported stored energy reserves.

18. The method of claim 1, further comprising charging a storage system for electrical energy using the power supply mains or using electrical energy generated in the elevator installation.

19. An elevator installation, comprising:
   an elevator unit; and
   an elevator control coupled to the elevator unit, the elevator control performing a method, the method comprising,
   receiving first control information, the first control information being based on local requirements of users,
   receiving second control information from a power supply mains, the second control information comprising status data for the power supply mains,
   evaluating the first and second control information using the elevator control, and
   operating the elevator installation using the elevator control, the operating being based on the first and second control information;
   creating the second control information using a monitoring unit, the second control information being based on a loading of the power supply mains, the monitoring unit being coupled to the power supply mains; and
   sending the second control information from the monitoring unit to the elevator control, regulating energy for the power supply mains being reduced.

20. The method of claim 1, further comprising exchanging one of positive regulating energy and negative regulating energy between the elevator installation and the power supply mains.

* * * * *